United States Patent
Ouyang et al.

(10) Patent No.: US 12,423,906 B2
(45) Date of Patent: Sep. 23, 2025

(54) RAY TRACING USING RESERVOIR RESAMPLING WITH SPATIAL SHIFT-MAPPING

(71) Applicant: NVIDIA Corporation, Santa Clara, CA (US)

(72) Inventors: Yaobin Ouyang, Shanghai (CN); Nan Lin, Shanghai (CN); Jacopo Pantaleoni, Berlin (DE); Markus Kettunen, Urdorf (CH); Shiqiu Liu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 9 days.

(21) Appl. No.: 18/607,901

(22) Filed: Mar. 18, 2024

(65) Prior Publication Data

US 2024/0249463 A1 Jul. 25, 2024

Related U.S. Application Data

(63) Continuation of application No. 17/632,492, filed as application No. PCT/CN2021/100056 on Jun. 15, 2021, now Pat. No. 11,935,177.

(51) Int. Cl.
G06T 15/06 (2011.01)
G06T 15/50 (2011.01)

(52) U.S. Cl.
CPC .......... *G06T 15/06* (2013.01); *G06T 15/506* (2013.01)

(58) Field of Classification Search
CPC ................... G06T 15/06; G06T 15/506
See application file for complete search history.

(56) References Cited

U.S. PATENT DOCUMENTS

| 7,567,248 B1 | 7/2009 | Mark et al. |
| 2005/0041024 A1* | 2/2005 | Green ..................... G06T 15/06 |
| | | 345/426 |
| 2008/0074420 A1 | 3/2008 | Kuesel et al. |
| 2008/0192050 A1 | 8/2008 | Schardt et al. |
| 2010/0328310 A1 | 12/2010 | Peterson et al. |
| 2017/0109898 A1 | 4/2017 | Koylazov |
| 2018/0018814 A1 | 1/2018 | Dahm et al. |
| 2021/0012562 A1* | 1/2021 | McGuire ............... G06T 15/506 |
| 2022/0108497 A1 | 4/2022 | Panteleev |
| 2022/0180591 A1 | 6/2022 | Taskov et al. |
| 2022/0198746 A1* | 6/2022 | Wyman ................ G06T 15/506 |

(Continued)

FOREIGN PATENT DOCUMENTS

| CN | 103765481 A | 4/2014 |
| CN | 104157004 A | 11/2014 |
| CN | 112669433 A | 4/2021 |

OTHER PUBLICATIONS

Schied, Christoph, "Spatiotemporal variance-guided filtering: real-time reconstruction for path-traced global illumination", Jul. 2017, Association for Computing Machinery, pp. 1-12 (Year: 2017).*

(Continued)

Primary Examiner — Terrell M Robinson
(74) Attorney, Agent, or Firm — Lowenstein Sandler LLP

(57) ABSTRACT

Disclosed are apparatuses, systems, and techniques to render images with global illumination using efficient ray tracing, light source identification, and reservoir resampling that deploys temporal and spatial reservoirs.

20 Claims, 11 Drawing Sheets

(56) References Cited

U.S. PATENT DOCUMENTS

| | | | | |
|---|---|---|---|---|
| 2022/0366530 A1* | 11/2022 | Murdison | ............... | G06F 3/017 |
| 2023/0326124 A1* | 10/2023 | Panteleev | ............... | G06T 13/00 |
| | | | | 345/426 |

OTHER PUBLICATIONS

Majercik, Zander, "Dynamic Diffuse Global Illumination with Ray-Traced Irradiance Fields", 2019, Journal of Computer Graphics Techniques, vol. 8, pp. 1-30 (Year: 2019).*

Bitterli B., et al., "Spatiotemporal Reservoir Resampling for Real-Time Ray Tracing With Dynamic Direct Lighting," ACM Transactions on Graphics, Jul. 2020, vol. 39, No. 4, Article 148, 17 Pages.

International Search Report and Written Opinion for International Application No. PCT/CN2021/100056, mailed Mar. 9, 2022, 6 Pages.

Makitalo M. J., et al., "Systematic Evaluation of the Quality Benefits of Spatiotemporal Sample Reprojection in Real-Time Stereoscopic Path Tracing," IEEE Access, 2020, vol. 8, pp. 133514-133526.

* cited by examiner

RAY TRACING USING RESERVOIR RESAMPLING WITH SPATIAL SHIFT-MAPPING

RELATED APPLICATIONS

This application is a continuation application of a co-pending U.S. patent application Ser. No. 17/632,492, "Ray Tracing Using Reservoir Resampling with Spatial Shift-Mapping," filed Feb. 2, 2022, which is a U.S. National Stage application under 35 USC 371 of international application PCT/CN21/100056, filed Jun. 15, 2021, the entire contents of which are incorporated herein by reference.

TECHNICAL FIELD

At least one embodiment pertains to computational technologies used to perform and facilitate graphics applications. For example, at least one embodiment pertains to operations utilized in the context of global illumination and ray tracing during rendering of realistic images of complex sceneries that involve multiple sources of light and various reflective objects having different physical and optical properties.

BACKGROUND

Image rendering (image synthesis) is a process of generating realistic images from scene data, which can involve various two-dimensional and/or three-dimensional models. The scene data can include positions and geometry (shape, size, orientation, etc.) of various objects of the scene, locations of sources of light, intensity, type, and color of light produced by the sources, information about reflectivity/absorptivity of objects that reflect the light, and so on. Rendering can then determine how each object of the scene should appear to a viewer looking at the scene from a particular vantage point. A successful rendering algorithm often involves laws of physics, physiological science of color perception, mathematical and statistical modeling, and the like, in addition to complex software development and efficient utilization of processing hardware. Rendering can be static and/or dynamic. In the latter case, objects and/or the vantage point of the viewer can be moving, so that the rendering is performed in real time.

DETAILED DESCRIPTION

Figure 1A:
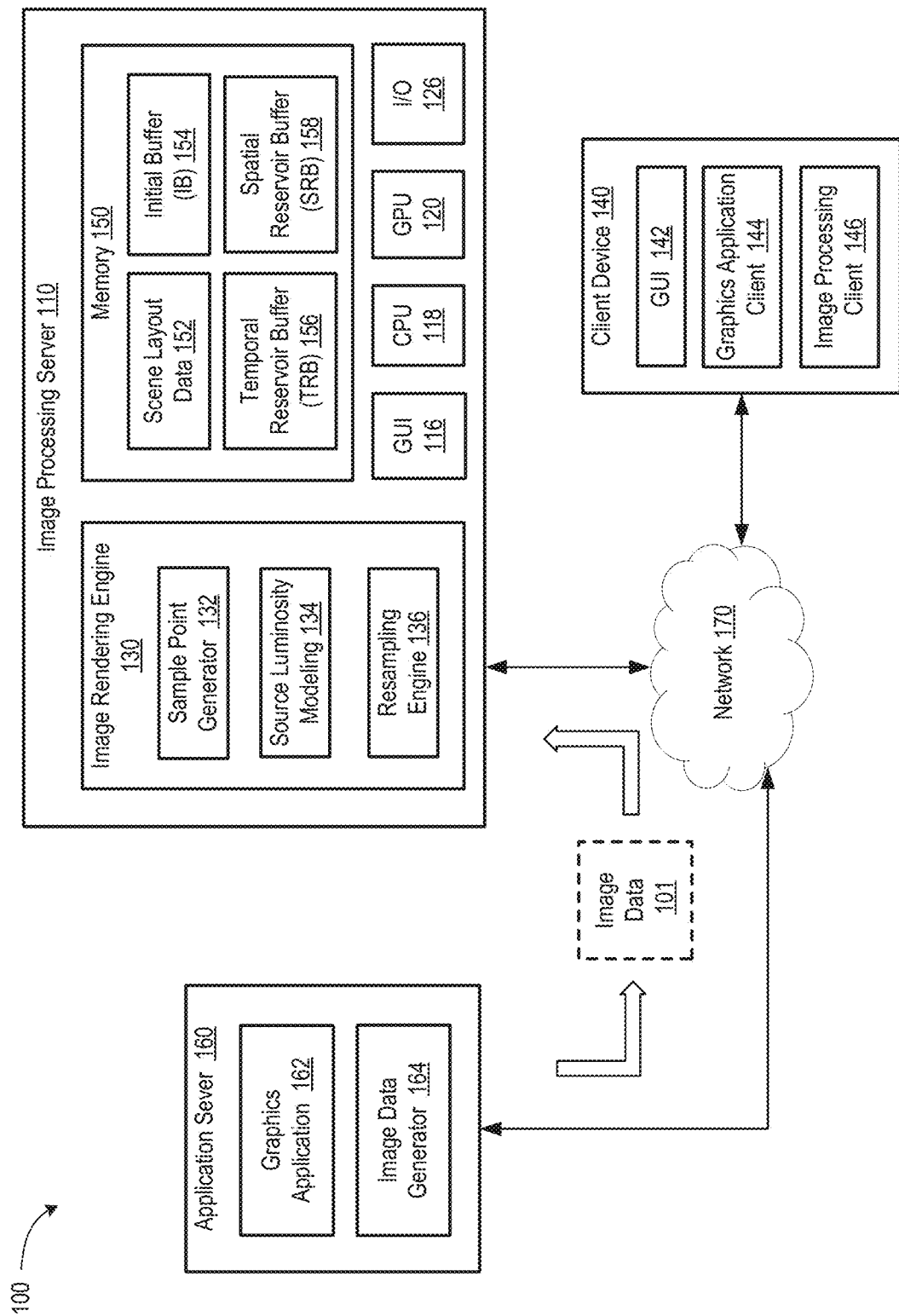
FIG. 1A is a block diagram of an example computer system that uses light source discovery and reservoir resampling for efficient ray tracing during rendering of images, in accordance with at least some embodiments.

High quality image rendering is a computationally intensive technology that often involves a large amount of processing and memory resources. Optimization of algorithms and efficient implementation of those algorithms on a hardware available to a user (developer) is, therefore, an important technological goal. Global illumination algorithms allow rendering realistic three-dimensional (3D) scenes. Global illumination takes into account that various objects in a scene are not only illuminated by direct sources of light (e.g., sun, electric lights, light coming through a window, etc.), but are also subject to light reflected from various other objects, which can include light reflected multiple times. For example, a light beam entering a room through a sunroof may reflect from a mirror, from a glossy surface of a hardwood floor, from a matte surface of a kitchen countertop, from a painting on the wall, and so on. Different surfaces can have different reflection properties (e.g., a particular combination of absorption, transmission, specular reflection, diffuse reflection, and the like), which may be described using a bidirectional reflection distribution function (BRDF) that characterizes surface reflectivity for specific directions of incident and reflected (or scattered) light.

Global illumination produces images that are of significantly higher quality than those that are rendered by algorithms that utilize only direct illumination, but the improvement comes at a substantial computational cost. Because a number of rays along which light can travel in a realistic scene is unlimited (with rays associated with multiple reflections increasing that number even further), it is advantageous to develop methods and systems that identify a limited number of rays, but such that are of the most utility for realistic simulation of light (and color) in rendered images. Additional challenges arise in rendering dynamic images that depict scenes changing with time. For example, dynamic images may include simulated images of moving objects, images of objects illuminated with moving light sources or light sources of varying brightness, gaming scenes (including scenes that are rendered in real time based on players' inputs, and the like. Keeping track of multiple rays (and associated with such rays reflectivity and luminosity data) for consecutive images (e.g., images corresponding to different frames) can require significant memory resources. Potentially, numerous light sources (direct or reflected) associated with each point in the rendered image may need to be considered. Existing approaches include identifying various light sources and determining how the identified light sources illuminate various points in the image.

Aspects and embodiments of the present disclosure address technological challenges of realistic rendering of static and dynamic images by disclosing methods and systems that optimize usage of memory and computational resources for efficient and accurate determination of illumination of various points of the images. For example, during each computational cycle (which may correspond to an imaging frame of a dynamic image), a ray may be extended from various image points (IPs) of the scene being rendered and an intersection of the ray with another object of the scene (herein referred to as a sample point, or SP) may be identified. Sample points are potential illuminants of the image points. With each new cycle, information about newly discovered sample points may be stored in a temporal reservoir buffer (TRB). The TRB may include elements assigned to various image points of the image. The TRB elements may store statistical information about various sample points discovered for the respective IPs during previous cycles. Information about new sample points is added into the TRB at each cycle and may be used for determining illumination of the respective image points.

In some implementations, discovery of additional sample points for various image points may be facilitated by maintaining an additional spatial reservoir buffer (SRB) that collects statistical information about source points discovered for multiple image points within a certain neighborhood of image points. Information collected from multiple TRB elements and stored in the SRB may also be used for efficient rendering of the image, in some embodiments.

System Architecture

FIG. 1A is a block diagram of an example computer system 100 that uses light source discovery and reservoir resampling for efficient ray tracing during rendering of images, in accordance with at least some embodiments. As depicted in FIG. 1A, a computer system 100 may include various devices for processing image data 101, such as an image processing server 110, an application server 160, and a client device 140 connected via a network 170. Network 170 may be a public network (e.g., the Internet), a private network (e.g., a local area network (LAN), or wide area network (WAN)), a wireless network, a personal area network (PAN), or any combination thereof.

Image processing server 110 may be (or include) a desktop computer, a laptop computer, a smartphone, a tablet computer, a local server, a cloud server, a dedicated graphics server, a collection of multiple computing device, a distributed computing system, a smart TV, an augmented reality device, or any other suitable computing device (or collection of computing devices) capable of performing the techniques described herein. Application server 160 and client device 140 may similarly include any computing device referenced above. Alternatively, client device 140 may be a computing device that lacks significant computing resources but is capable of accessing and communicating with image processing server 110 and/or application server 160. Client device 140 may have a graphical user interface (GUI) 142 to facilitate user interaction with client device 140, application server 160, and image processing server 110. GUI 142 may be implemented on a desktop or laptop computer screen, touchscreen, smart TV screen, or any combination thereof. Interaction with GUI 142 may enabled using any pointing device (mouse, touchpad, stylus, finger, eye motion-controlled device, etc.), keyboard, control column, game console, and the like. GUI 142 may display stationary and moving objects, light sources, shadows, colors, menus, and so on, e.g., using a browser, a desktop application, a mobile application, etc.

Client device 140 may include a graphics application client 144 and an image processing client 146. Graphics application client 144 may be a client application provided and/or supported by a graphics application 162 running on application server 160. Graphics application 162 may be any artistic, medical, scientific, engineering application, etc. For example, graphics application 162 may be an image-making application, movie-making application, video game application, engineering application, architectural application, flight simulation application, scene reconstruction application, or the like. Graphics application 162 may operate in conjunction with an image data generator 164. Image data generator 164 may receive from graphics application 162 settings for one or more images. For example, graphics application 162 may be a video application that provides a game context, e.g., current locations of the players relative to a map of buildings. Image data generator 164 may generate coordinates of various objects, properties of surfaces of those objects (e.g., reflectivity for various directions of light incidence and reflection), locations, luminosity, and color of light emitted by various light sources, and so on.

Image data 101 produced by image data generator 164 may be provided (e.g., over network 170) to an image rendering engine 130 of image processing server 110 for generation of one or more images, based on image data 101. In some embodiments, image data 101 may include one or more sample images to be used as base images for generation of additional images that are similar to the base images. For example, image data 101 may include several outdoor and/or indoor images of an environment to be used as a scenery for a computer game (e.g., being developed by a user of graphics application 162 via graphics application client 144). Image processing server 110 may be tasked with generating various images to support the computer game. Image processing server 110 may identify various objects and sources of light in the received images and use this data in generating additional images that involve different vantage points, different arrangement of the objects, additional objects, additional or different sources of light, and so on.

The generated images may be in any digital (e.g., pixel-based or vector-based) format, including but not limited to JPEG, GIF, PNG, BMP, TIFF, CIB, DIMAP, NITF, and the like. In some embodiments, the image data 101 may include a scene layout data 152, which includes positions of various objects, physical and optical properties of the objects (e.g., reflectance functions of the objects for different wavelength of light), locations, intensity, and spectral characteristics of various sources of light, and so on. Scene layout data 152 may be stored in memory 150. Image processing server 110 may retrieve scene layout data 152 from memory 150 and identify, using a sample point generator 132, location of sources of light (including sources of direct and reflected light) that illuminate various points (image points) in the image being rendered. Based on identified, e.g., using Monte Carlo stochastic simulations, sample points and direction (and length) of rays connecting sample points with image points, a source luminosity modeling component 134 may determine the amount of light reaching various image points. In some implementations, a resampling engine 136 may make use of stochastic resampling of previously identified sample points in a way that tracks a correct distribution of sample points (as described in more detail below in conjunction with FIGS. 2-6). In some embodiments, data generated by sample point generator 132 (for various image points) may be stored in an initial buffer (IB) 154. Data in the initial buffer 154, together with resampled data previously identified by sample point generator 132, may be stored in a temporal reservoir buffer (TRB) 156. Similarly, sample points collected for various image points over the course of multiple computational cycles may be resampled and stored in a spatial reservoir buffer (SRB) 158. The content of TRB 156 and/or SRB 158 may be used by image processing server 110 to render one or more realistic images of the scene.

Memory 150 may be communicatively coupled with one or more processing devices of image processing server 110, such as one or more graphics processing units (GPU) 120 and one or more central processing units (CPU) 118. Image rendering engine 130 may be executed by GPU 120 and/or CPU 118 or a combination thereof. Image processing server 110 may further include input/output (I/O) component(s) 126 to facilitate exchange of information with various peripheral devices.

Even though image processing server 110, application server 160, and client device 140 are shown in FIG. 1A as separate devices, in various embodiments, any two (or all) of these devices may be combined on a single computing machine. For example, image processing server 110 and application server 160 may be executed on the same machine which is remotely accessed by client device 140. In another embodiment, image processing server 110, application server 160, and client device 140 may be executed on a local computer (e.g., desktop or laptop) of a user (or developer).

Figure 1B:
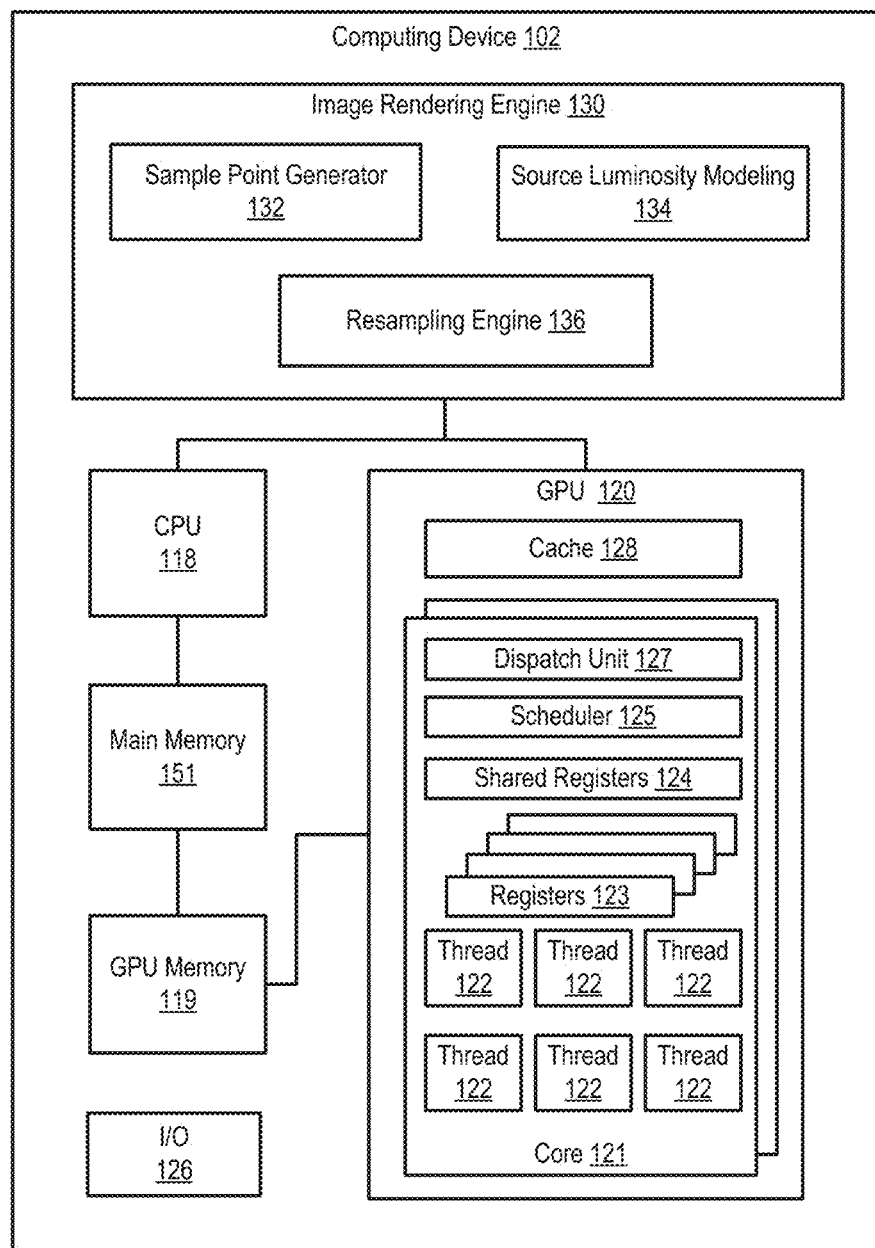
FIG. 1B is an example computing device that may implement light source discovery and reservoir resampling for efficient ray tracing with global illumination, in accordance with at least some embodiments.

FIG. 1B is an example computing device 102 that may implement light source discovery and reservoir resampling for efficient ray tracing with global illumination, in accordance with at least some embodiments. In some embodiments, computing device 102 may be an image processing server 110 or some other computing device that implements image rendering engine 130. In some embodiments, image rendering engine 130 may be executed by one or more GPUs 120 and may include sample point generator 132, source luminosity modeling component 134, and resampling engine 136 that perform discovery of sample points, resampling of previously discovered sample points, and rendering of images using discovered and resampled sample points, as described in more detail in conjunction with FIGS. 2-6. In some embodiments, a GPU 120 includes multiple cores 121, each core being capable of executing multiple threads 122. Each core may run multiple threads 122 concurrently (e.g., in parallel). In some embodiments, threads 122 may have access to registers 123. Registers 123 may be thread-specific (private) registers with access to a particular register restricted to a respective thread. Additionally, shared registers 124 may be accessed by all threads of the core. In at least one embodiment, each core 121 may include a scheduler 125 to distribute computational tasks and processes among different threads 122 of core 121. A dispatch unit 127 may implement scheduled tasks on appropriate threads using correct private registers 123 and shared registers 124. Computing device 102 may include input/output component(s) 126 to facilitate exchange of information with peripheral devices, as well as users and developers.

In some embodiments, GPU 120 may have a (high-speed) cache 128, access to which may be shared by multiple cores 121. Furthermore, computing device 102 may include a GPU memory 119 where GPU 120 may store intermediate and/or final results (outputs) of various computations performed by GPU 120. After completion of a particular task, GPU 120 (or CPU 118) may move the output to main memory 151. In some embodiments, CPU 118 may execute processes that involve serial computational tasks whereas GPU 120 may execute tasks (such as sample discovery, reservoir resampling and various other techniques) that are amenable to parallel processing. In some embodiments, image rendering engine 130 may determine which processes are to be executed on GPU 120 and which processes are to be executed on CPU 118. In other embodiments, CPU 118 may determine which processes are to be executed on GPU 120 and which processes are to be executed on CPU 118. In some embodiments, various buffers, such as IB 154, TRB 156, and SRB 158, may be implemented as part of main memory 151 (not shown). In other embodiments, any or all of IB 154, TRB 156, and SRB 158 may be implemented as part of private registers 123 or shared registers 124 of GPU 120.

Figure 2:
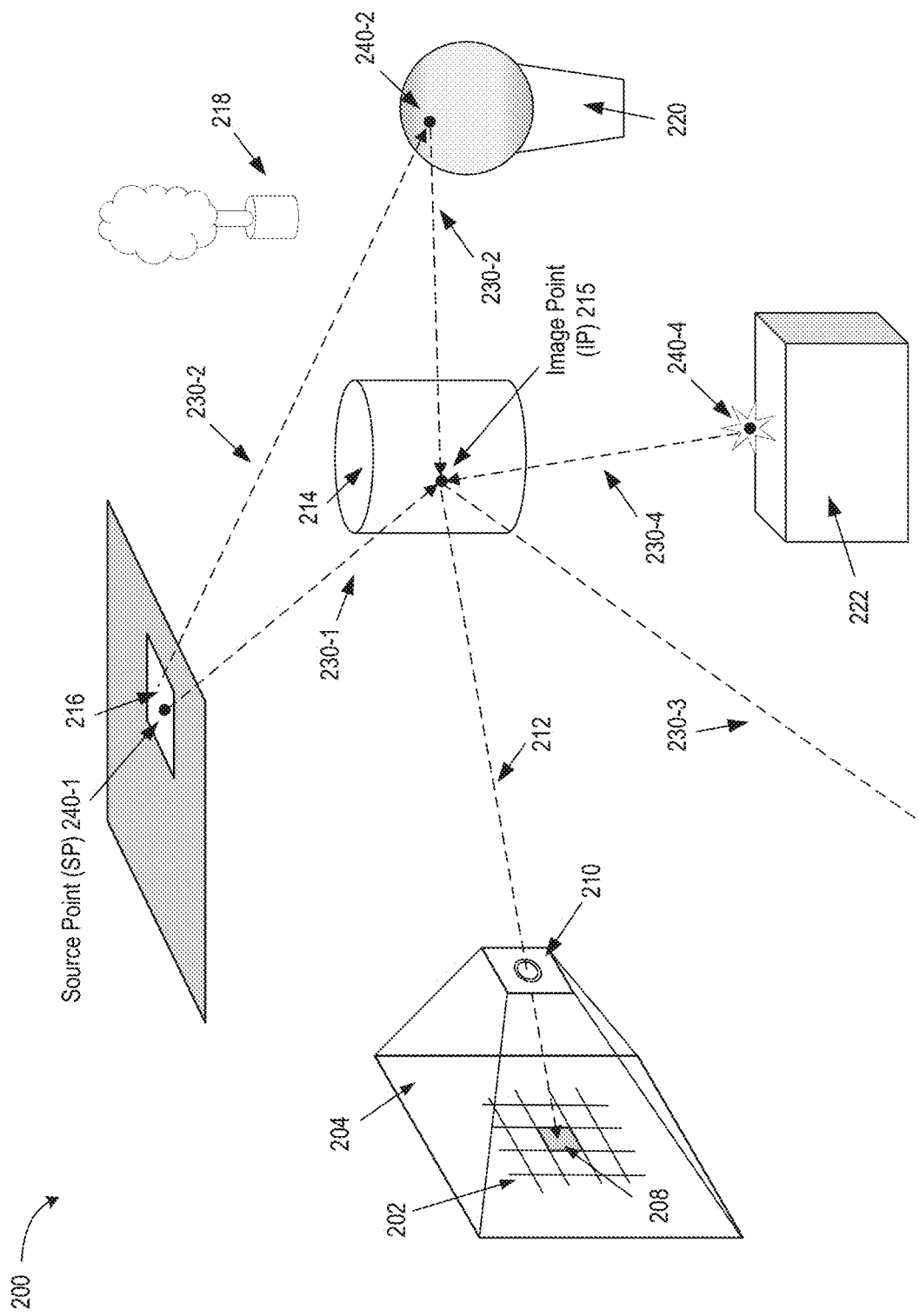
FIG. 2 illustrates an example setup for image rendering using efficient ray tracing, light source discovery, and reservoir resampling for rendering of images with global illumination, in accordance with at least some embodiments.

FIG. 2 illustrates an example setup 200 for image rendering using efficient ray tracing, light source discovery, and reservoir resampling for rendering of images with global illumination, in accordance with at least some embodiments. A scene whose image is being rendered may include animated objects (people or other living beings), elements of interior (walls, windows, pieces of furniture, art objects, etc.), elements of exterior (trees, building, roads, landscaping, mountains, clouds, sky, etc.). As depicted schematically, a scenery that includes multiple objects and sources of light may be rendered on a pixel array 202. Pixel array 202 may be visualized as an image plane (or some other imaging surface, e.g., a curved surface) of a camera 210, although specific camera design need not be modeled. A pixel 208 of pixel array 202 (the size of the pixel is exaggerated and not to scale, for the case of depiction) may be associated with a particular direction (or a certain small solid angle of directions) toward the scene. This direction for pixel 208 may further be thought as the direction of a light beam (ray) 212 that is incident on pixel 208 (as shown by the corresponding arrow). Absent dust, fog, or some other particulate matter along the length of ray 212, ray 212 intersects one of the objects of the scene, e.g., object 214, at a point referred to throughout this disclosure as an image point (IP) 215. Light intensity (and spectrum) or ray 212 is determined by all light emitted (or reflected) by IP 215 towards pixel 208. In some instances, IP 215 may itself be a source of direct light (a generator of light energy), such as a light bulb, sun, lighting, and the like. In other instances, IP 215 may be a source of reflected (or transmitted) light. The intensity of the reflected light is, generally, determined by a bidirectional reflectance distribution function (BRDF) of the element of surface of object 214 at IP 215, which in turn depends on surface properties at that location. Accordingly, an unlimited number of source points of other objects (e.g., objects 216, 218, 220, 222, etc.) may contribute to the light incident on IP 215 and, therefore, may determine how much light is being directed to pixel 208 along ray 212. The total radiance of IP 215 in the direction of pixel 208 may be determined as an integral $$L(IP \to \text{Pixel}) = \int_x f(x) dA,$$

which extends over all source points x that can possibly illuminate IP 215 (e.g., all source points that can be connected to IP 215 by a straight ray), with dA indicating a surface element associated with the respective source point. The function $f(x)$ that determines the contribution of the respective source point, $$f(x) = I(x \to IP) \times G(x \to IP) \times BRDF(x \to IP, IP \to \text{Pixel}),$$

where $I(x \to IP)$ indicates the intensity of light emitted (or reflected) by source point x in the direction of IP 215, $G(x \to IP)$ is the geometric factor (e.g., Green's function) that describes decrease (e.g., inverse proportionality to the squared distance) of the intensity of light in the course of propagation from the source point x to IP 215 (and may further include mutual visibility between source point x and the IP), and BRDF $(x \to IP, IP \to \text{Pixel})$ determines the reflectance from the direction of light incident on IP 215 $(x \to IP)$ to the direction of light reflected by IP 215 $(IP \to \text{Pixel})$.

A Monte Carlo-based ray tracing may alleviate the need to integrate over an infinite number of source points x by replacing the integral over source points with a finite sum over sampled (discovered) source points $x_i$, referred herein to as sample points (SP). If N SPs are selected according to a distribution $p(x_i)$ that is correlated with the radiance density $f(x_i)$, the total radiance of ray 212 is $$L(IP \to \text{Pixel}) = \frac{A}{N} \sum_{i=1}^{N} \frac{f(x_i)}{p(x_i)},$$

where A is an appropriately chosen normalization constant. In some embodiments, even though the function $f(x_i)$ may be known (e.g., computed by source luminosity modeling component 134), sampling according to the correlated distribution $p(x_i)$ may be difficult. Instead, sample point generator 132 may generate SPs $x_i$ according to a different distribution $p_0(x_i)$ sampling from which may be computationally easier. For example, distribution $p_0(x_i)$ may be a uniform (e.g., isotropic) distribution, a cosine distribution, or some other distribution. Accordingly, the total radiance of ray 212 may alternatively be computed from, $$L(IP \to \text{Pixel}) = \frac{A}{N} \sum_{i=1}^{N} \frac{f(x_i)}{p(x_i)} \times w(x_i),$$

where $$w(x_i) = \frac{p(x_i)}{p_0(x_i)}$$

is the weight associated with SP $x_i$. If the target distribution $p(x_i)$ is well correlated with the radiance density $f(x_i)$, the choice of a specific SP in the ratio $f(x_i)/p(x_i)$ may be arbitrary, as long as for a chosen SP (e.g., y) the target distribution is non-zero $p(y) \neq 0$ (or not too close to zero). The total radiance of ray 212 may then be computed as a sum of respective weights of SPs:

$$L(IP \to \text{Pixel}) = A \times \frac{f(y)}{p(y)} \times W_N,$$

$$W_N = \frac{1}{N} \sum_{i=1}^{N} w(x_i),$$

where $W_N$ is the average weight of all sample points that have been identified for the IP.

In ray tracing that uses reservoir resampling, the running value of the weight $W_M$ may be stored in a reservoir and then updated when a new SP is discovered and the number of SPs in the reservoir increased, e.g., from M to M+1. In the context of global illumination, the reservoir resampling may be performed as follows. At each computational cycle, a ray may be extended from IP 215 along some randomly sampled (according to distribution $p_0(x)$) direction, and an intersection of the ray with an object (e.g., a closest object to IP 215 along the length of the selected ray) may be recorded, e.g., stored in the initial buffer (IB) 154. A cycle may refer to a frame of a dynamic image being rendered in which at least one object is moving relative to the pixel array (e.g., pixel array 202). In those instances where a static image is being rendered, a cycle may refer to a computational iteration during rendering of the image. Even though the example description below uses a single SP discovered per cycle, any number (e.g., n) of rays may be extended from IP 215 per cycle and n sample points may be identified. A particular number of rays extended per cycle may be determined by balancing the speed of rendering (increased with the use of multiple rays) against use of memory resources (which likewise increases with the use of additional rays).

For example, during a particular cycle (which can be a first cycle of rendering or any subsequent cycle), a ray 230-1 may be stochastically extended (traced) from IP 215 and may intersect a window 216 in a ceiling at a SP 240-1 (denoted as $x_1$) and a corresponding weight $w(x_1)$ may be stored in IB 154. IB 154 may be a two-dimensional image-sized memory array. The memory array may be stored in a linear (one-dimensional) row-wise or column-wise memory array (e.g., a register). Each pixel in the array may have an element (struct) assigned to that pixel that stores information associated with an IP that is being imaged by the respective pixel. In some embodiments, in addition to the weight $w(x_1)$ of SP 240-1 discovered during the first cycle for IP 215, stored in the respective element of IB 154 may also be:

- coordinates (e.g., Cartesian, spherical, cylindrical, etc.) of IP 215;
- surface orientation of IP 215 (e.g., the direction of a normal to the surface of object 214 at the location of IP 215);
- coordinates (Cartesian, spherical, cylindrical, etc.) of SP 240-1;
- surface orientation of SP 240-1 (e.g., the direction of a normal to the window at the location of the SP);
- radiance of SP 240-1 in the direction of IP 215 (which may be computed by source luminosity modeling component 134 using scene layout data 152);
- value $p(x_1)$ of the target distribution;
- as well as other suitable information.

The above (and/or other) information stored in the element of IB 154 assigned to pixel (IP 215) may be referred to as a "sample" associated with sample point 240-1.

During a second cycle, a new ray 230-2 may be extended from IP 215 along another stochastically chosen direction. Ray 230-2 intersects object 220 at a second SP 240-2, which (as depicted) may correspond to a surface that has no radiance other than the radiance due to reflected light (e.g., of the light entering through window 216). During a third cycle, ray 230-3 may be selected. Ray 230-3 may identify a SP that has very low radiance (e.g., a dark corner of a room, a black non-reflecting item of furniture, etc.). In some embodiments, SPs that have radiance below a certain threshold radiance may be ignored and a different ray may be selected during the same cycle. During a fourth cycle, selected may be ray 230-4 that intersects object 222 at a location where another light is positioned, giving rise to SP 240-4.

IB 154 may collect samples discovered during the current cycle and overwrite samples discovered during the previous cycle with new information. TRB 156 serves as a reservoir of samples discovered during earlier cycles. Similarly to IB 154, TRB 156 may be a two-dimensional image-sized array having elements assigned to various pixels. The memory array may be stored as a linear (one-dimensional) row-wise or column-wise array (e.g., register). Each of TRB 156 elements stores a sample (information associated with a SP) that has been discovered during one of the earlier cycles in association with a respective pixel (IP). The probability of TRB storing a particular sample may be determined by the weight $w(x_i)$ of the respective SP. For example, if during the first cycle, SP $x_1$ is discovered as a source of illumination for a given IP, this SP $x_1$ may be placed in TRB 156 element associated with the IP. When another SP $x_2$ is discovered during the second cycle (and stored in IB 154), relative weights of the two SPs may determine which sample ends up in TRB 156. Specifically, with probability $w(x_1)/[w(x_1)+w(x_2)]$, the first SP $x_1$ may be retained in TRB 156; and with probability $w(x_2)/[w(x_1)+w(x_2)]$, the second SP $x_2$ may overwrite the first SP $x_1$ in TRB 156. In both instances, the SP that ends up being stored in the TRB (denoted as y) is assigned a new weight that is the average of the weights of the two SPs discovered so far: $W_2=[w(x_1)+w(x_2)]/2$. The total radiance of pixel 208 (via IP 215), with two SPs discovered after two cycles, may then be rendered as $$L(IP \to \text{Pixel}) = A \times \frac{f(y)}{p(y)} \times W_2.$$

The process of adding newly discovered SPs into IB 154 and stochastically replacing SPs in TRB 156 may be extended to arbitrary later cycles. Even though in this and the subsequent examples a single SP is added per cycle, it should be understood that any number of rays may be selected and, correspondingly, any number of SPs may be added per cycle in a similar manner. Referring again to a single-SP discovery per cycle, for simplicity, during M-th cycle, a new SP $x_M$ is placed into IB 154, $$IB(M) \leftarrow x_M$$

and then the updated IB 154 is used to probabilistically update TRB 156, e.g., symbolically:

$$TRB(M) \leftarrow TRB(M-1) + IB(M).$$

Figure 3A:
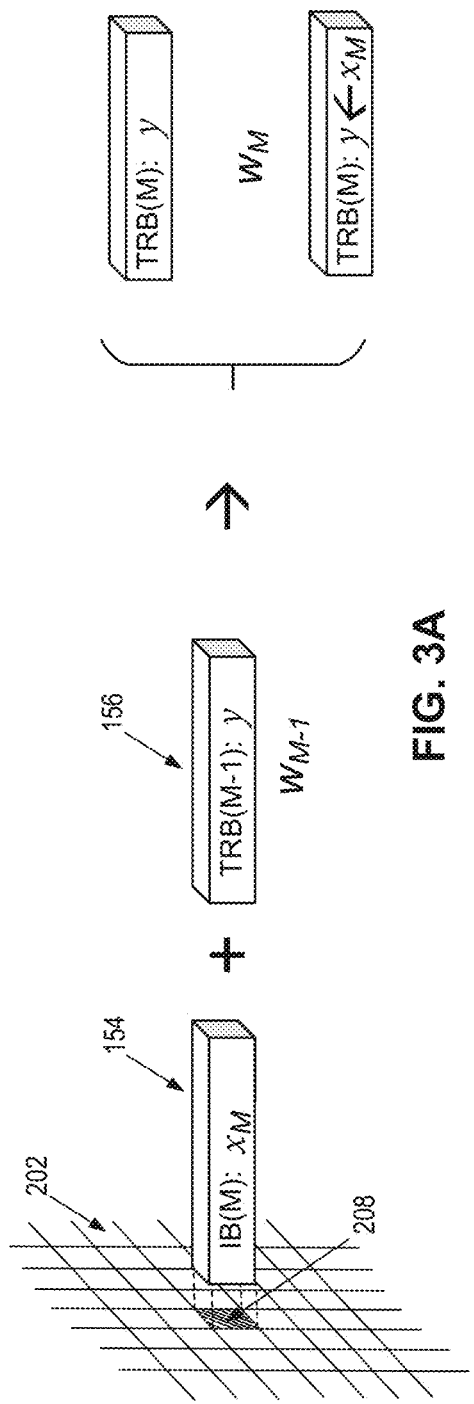
FIG. 3A illustrates reservoir resampling using a temporal reservoir buffer, in accordance with at least some embodiments.

FIG. 3A illustrates reservoir resampling using a temporal reservoir buffer, in accordance with at least some embodiments. Shown schematically is an element of IB 154 associated with pixel 208 of pixel array 202. Also shown is a respective element of TRB 156 after previous M−1 samples have been identified for the IP (e.g., IP 215). TRB 156 is storing a SP y, which is one of the previously identified SPs. As shown in FIG. 3A, a new SP $x_M$ is stored in IB 154, together with the weight $w(x_M)$. The new SP is placed in TRB 156 with the probability $$P(\text{Replace}) = \frac{w(x_M)}{\sum_{j=1}^{M} w(x_j)},$$

determined by the weight of the new SP relative to the total weight of SPs identified so far. In this instance, the new SP $x_M$ becomes the new value y to be stored in TRB 156. On the other hand, with probability $$P(\text{Maintain}) = 1 - \frac{w(x_M)}{\sum_{j=1}^{M} w(x_j)},$$

the previous SP y is maintained in TRB 156. It is straightforward to verify that after M samples are discovered, the described procedure ensures that each of the M identified samples $\{x_j\}$ has the probability $$\frac{w(x_i)}{\sum_{j=1}^{M} w(x_j)}$$

to be stored in TRB 156 after M cycles. Regardless of which SP y ends up being stored in TRB 156 after M cycles, the weight associated with SP y is the average weight of all discovered samples, $W_M = M^{-1} \times \Sigma M_{j=1}^{M} w(x_j)$. The average weight may be updated as follows, $$W_M = \frac{(M-1)}{M} W_{M-1} + \frac{1}{M} w(x_M),$$

based on the old average weight and the weight of the new SP (so that the individual weights of the previously discovered SPs need not be tracked). The radiance of pixel 208 by the light coming from IP 215 may (after M cycles) be determined based on the radiance density y of the SP currently stored in the respective element of TRB 156, the value of the target distribution p(y) for this SP, and the average weight, $$L(IP \to \text{Pixel}) = A \times \frac{f(y)}{p(y)} \times W_M.$$

With TRB 156 being updated with each cycle, each additional identified SP provides more and more complete picture of light sources illuminating each IP. When a static image is being rendered, the additional improvement in the image quality may become progressively smaller for very large M. Accordingly, the sample discovery process and reservoir resampling may be stopped after a pre-determined number of cycles N.

In the instances of dynamic images, discovery and resampling may be continued indefinitely (e.g., until the image rendering is no longer needed, a different scenery is to be rendered, and so on). When the vantage point is moving relative to the scenery (which may be a result of the camera moving, or the objects of the scenery moving, or both), sample points stored in various TRB elements may be relocated with each frame to their new positions. For example, if an IP associated with a certain part of a moving car (e.g., a front end) is moving with a known speed (e.g., defined in miles per hour) in a particular direction, the speed of the IP may also be recomputed in terms of pixels per second (or some other similar measure), and the distance (within pixel array 202) covered by the IP between two consecutive cycles may be identified. Specifically, between two frames, a particular IP may move from Pixel 1 to Pixel 2. Correspondingly, the content of the element of TRB 156 associated with Pixel 1 may be moved to the element associated with Pixel 2. In some embodiments, moving of the TRB content may be performed prior to tracing a new ray for the next frame (and the resampling of the TRB). In other embodiments, the content may be moved after ray tracing/resampling is performed.

In some instances, radiance of some of the sample points may change with time. For example, some light sources may dim (e.g., the sun may be obscured by clouds), be turned off (e.g., electric lights), or move away (e.g., lights of a car turning away from the camera). To account for such changing conditions, source luminosity modeling component 134 may periodically (e.g., every several frames) check if sample points that are currently in the TRB (being identified during previous frames) are no longer bright. Those sample points that have zero radiance or a radiance that is below some threshold value may be removed from the TRB.

Additionally, sample point generator 153 may maintain a spatial reservoir buffer (SRB) 158. SRB 158 stores samples and weights accumulated from TRB elements of several neighboring samples. The purpose of maintaining SRB 158 may be to speed-up discovery of samples, since each TRB can only discover at most a limited number of new samples per cycle (or frame). For example, TRB 156 accumulates source points at a rate that is determined by settings of a SP discovery, e.g. one SP per cycle, N SPs per cycle, etc. In this context, SRB 158 may improve efficiency of source point discovery. SRB 158, similarly to IB 154 and TRB 156, may be a two-dimensional image-sized array. SRB 158 serves as a reservoir of samples discovered by a whole neighborhood of pixels. More specifically, each SRB element is assigned to a particular pixel (e.g., pixel 208) of pixel array 202 (and, by association, to a particular IP illuminating the pixel 208) and resamples SPs stored in TRBs of a pre-determined neighborhood of pixel 208, e.g., pixels that are within a certain radius from pixel 208. For example, there may be only a few pixels in the neighborhood or several tens of pixels (or, in some embodiments, even more).

Figure 3B:
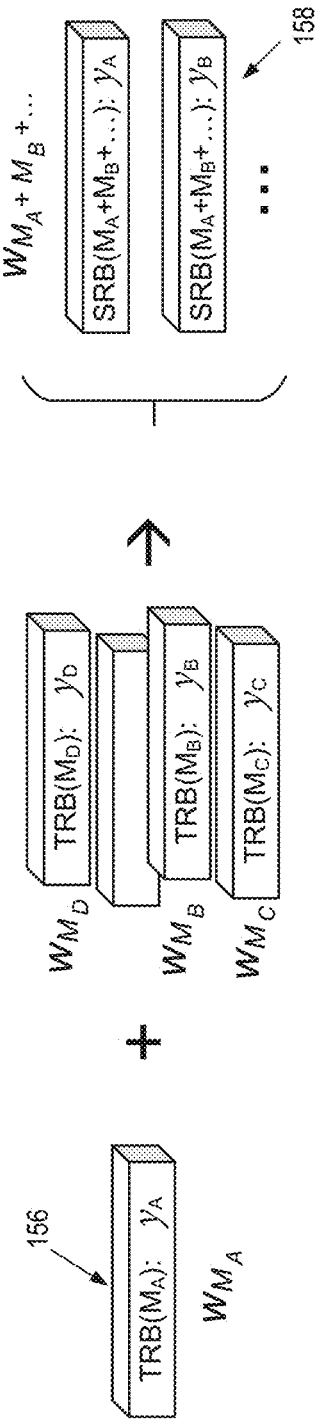
FIG. 3B illustrates reservoir resampling using a spatial buffer reservoir, in accordance with at least some embodiments.

FIG. 3B illustrates reservoir resampling using a spatial buffer reservoir, in accordance with at least some embodiments. Shown schematically is an element A of TRB 156 (referred herein to as TRB-A) associated with pixel 208 of pixel array 202. The element TRB-A may store a SP $y_A$ that is selected as described above, in conjunction with FIG. 3A, using sample discovery and resampling. SP $y_A$ stored in element TRB-A may be resampled from $M_A$ SPs discovered over a number of cycles (including, possibly, the current cycle) and may have an average weight $W_{M_A}$. Similarly, the pre-determined neighborhood of pixel 208 may include pixels associated with elements TRB-B, TRB-C, TRB-D, ..., storing SPS $y_B, y_C, y_D, ...$, having weights $W_{M_B}, W_{M_C}, W_{M_D}, ...$, respectively. Different TRB elements may have different numbers of resampled SPs (e.g., $M_A \ne M_B \ne M_C$ ... ). This may occur for a number of reasons. For example, some of the cycles may have produced no SPs for some of the pixels/IPs, some of the cycles may have resulted in some of the previously discovered SPs dropped (e.g., from becoming dark or moving outside the scene), and so on.

Sample $y_A$ from the native TRB-A (for pixel 208) is selected into SRB 158 element (for the same pixel 208) with probability $$\frac{M_A W_{M_A}}{M_A W_{M_A} + M_B W_{M_B} + M_C W_{M_C} + ...}.$$

Similarly, sample $y_B$ from TRB-B is selected with probability $$\frac{M_B W_{M_B}}{M_A W_{M_A} + M_B W_{M_B} + M_C W_{M_C} + ...},$$

sample $y_C$ from TRB-C is selected with probability $$\frac{M_C W_{M_C}}{M_A W_{M_A} + M_B W_{M_B} + M_C W_{M_C} + ...},$$

and so on. The combined weight of SP y selected into the element of SRB 158 is the same in the above instances:

$$W_{M_A + M_B + M_C + ...} = \frac{M_A W_A + M_B W_B + M_C W_C + ...}{M_A + M_B + M_C + ...}.$$

The radiance of pixel 208 by light coming from IP 215 may be determined based on the radiance density y of the SP accepted into the element of SRB 158, the value of the target distribution p(y) for this SP, and the combined weight according to, $$L(IP \to \text{Pixel}) = A \times \frac{f(y)}{p(y)} \times W_{M_A + M_B + M_C + ...}.$$

Figure 4B:
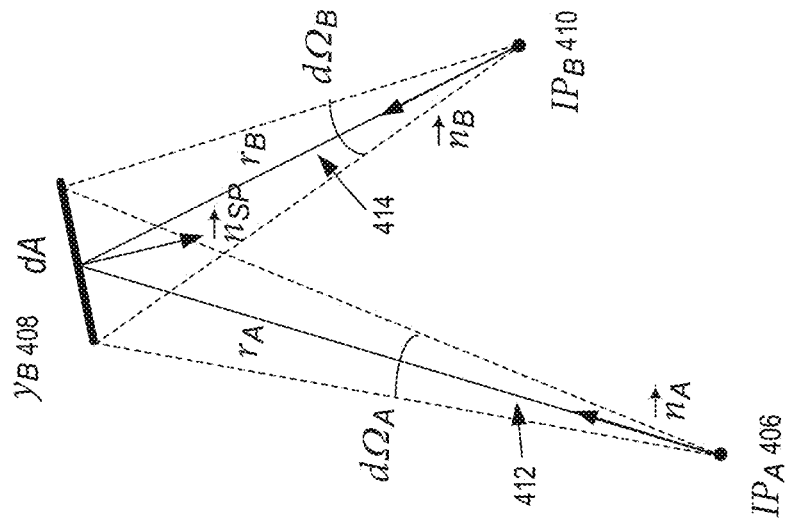
FIG. 4B illustrates schematically a geometric correction of a sampling weight captured by a transfer function in the course of resampling of non-native sources of illumination, in accordance with at least some embodiments.
Figure 4A:
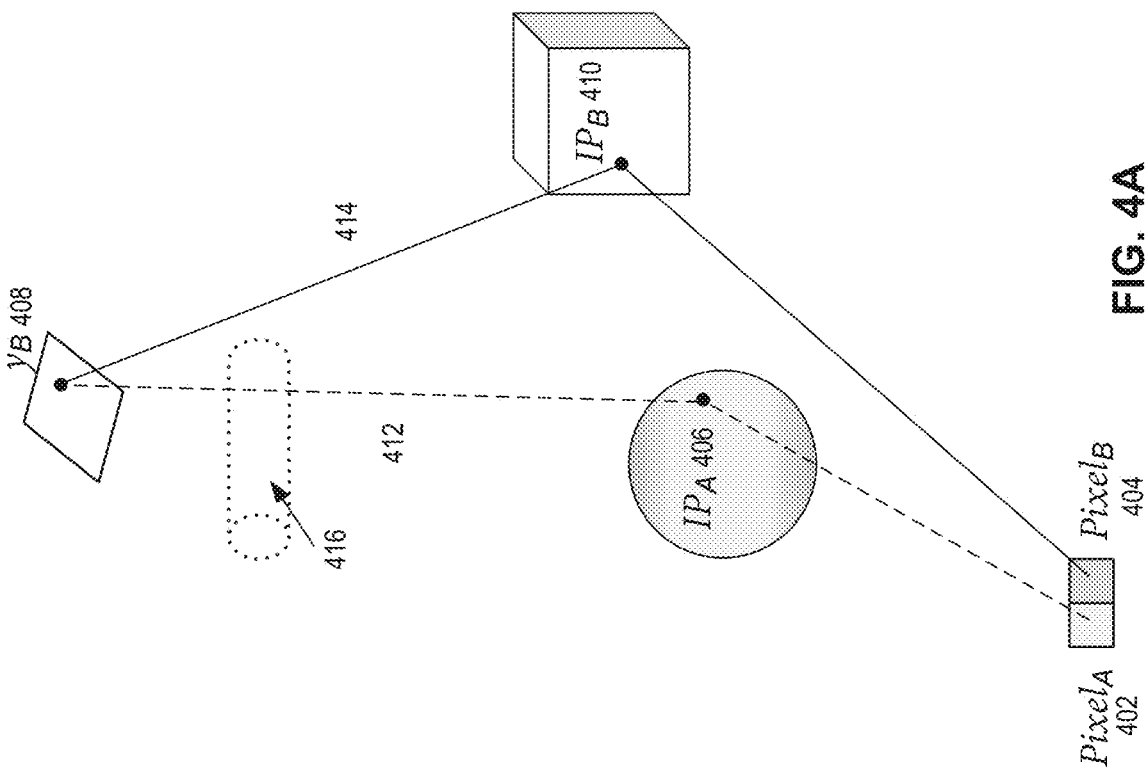
FIG. 4A illustrates resampling of non-native sources of illumination discovered for neighboring pixels, in accordance with at least some embodiments.

FIG. 4A illustrates resampling of non-native sources of illumination discovered for neighboring pixels, in accordance with at least some embodiments. Shown schematically are two pixels of a pixel array: $Pixel_A$ 402 and $Pixel_B$ 404. Although shown as nearest neighbors, $Pixel_A$ 402 and $Pixel_B$ 404 may have any number of intervening pixels between them. $Pixel_A$ 402 renders image of $IP_A$ 406 using elements of SRB 158 associated with $Pixel_A$ 402. SRB 158 may contains non-native SPs (that have been discovered for other pixels, e.g., $Pixel_B$ 404). For example, SP $y_B$ 408 may have been discovered for Pixel 404 by extending ray 414 from $IP_B$ 410 associated with $Pixel_B$ 404. SP $y_B$ 408 is native SP for $IP_B$ 410. Upon selecting and placing SP $y_B$ 408 into element of SRB 158 associated with $Pixel_A$ 402, source luminosity modeling component 154 may compute the radiance of non-native SP $y_B$ 408 (for $IP_A$ 406) along the direction of ray 412 (shown with the dashed line) and may also compute the amount of that illumination that is reflected by $IP_A$ 406 in the direction of $Pixel_A$ 402.

Additionally, a transfer function may be used to adjust the sampling weight of SP $y_B$ 408 when this sampling weight is used to render radiance at $IP_A$ 406. More specifically, while SP $y_B$ 408 is sampled from $IP_B$ 410 according to a particular probability of sampling (e.g., $p_0(y_B)$), the probability of sampling with respect to a different point (e.g., $IP_A$ 406) may be different from $p_0(y_B)$ since the directions to SP $y_B$ 408 are different from $IP_A$ 406 and $IP_B$ 410. For example, an isotropic (cosine, etc.) sampling from $IP_B$ 410 is no longer isotropic (cosine, etc.) from $IP_A$ 406. FIG. 4B illustrates schematically a geometric correction of a sampling weight captured by a transfer function in the course of resampling of non-native sources of illumination, in accordance with at least some embodiments. An element of surface dA near SP $y_B$ 408 is observed from $IP_B$ 410, located at distance $r_B$, to subtend an element of solid angle $d\Omega_B$ such that $$dA|\vec{n}_B \cdot \vec{n}_{SP}| = d\Omega_B r_B^2,$$

where $\vec{n}_B$ is the unit vector in the direction of ray 414 and $\vec{n}_{sp}$ is the unit vector in the direction of the normal to the surface at SP $y_B$ 408. Likewise, the same element of surface dA observed from $IP_A$ 416, located at distance $r_A$, subtends an element of solid angle $d\Omega_A$ such that $$dA|\vec{n}_A \cdot \vec{n}_{SP}| = d\Omega_A r_A^2,$$

where $\vec{n}_A$ is the unit vector in the direction of ray 412. Accordingly, the two solid angles are related by a Jacobian $J_{AB}$, $$d\Omega_A = J_{AB} \cdot d\Omega_B, \quad J_{AB} = \frac{r_A^2|\vec{n}_B \cdot \vec{n}_{SP}|}{r_B^2|\vec{n}_A \cdot \vec{n}_{SP}|}.$$

The Jacobian (also referred to as the transfer function) indicates how ray sampling performed from $IP_B$ 410 is to be adjusted to determine radiance of $IP_A$ 406. More specifically, the radiance of $Pixel_A$ 402 by the light coming from $IP_A$ 406 may be determined by adjusting the combined weight with the transfer function according to $$L(IP \to \text{Pixel}) = A \times \frac{f(y_B)}{p(y_B)} \times J_{AB} \times W_{M_A+M_B+M_C+\ldots}$$

In those instances where SRB 158 contains a native SP $y_A$ sampled from $IP_A$ 406 (and stored in TRB 156 elements associated with $Pixel_A$ 402), the transfer function need not be used (or, equivalently, may be set as $J_{AA}=1$).

Figure 5:
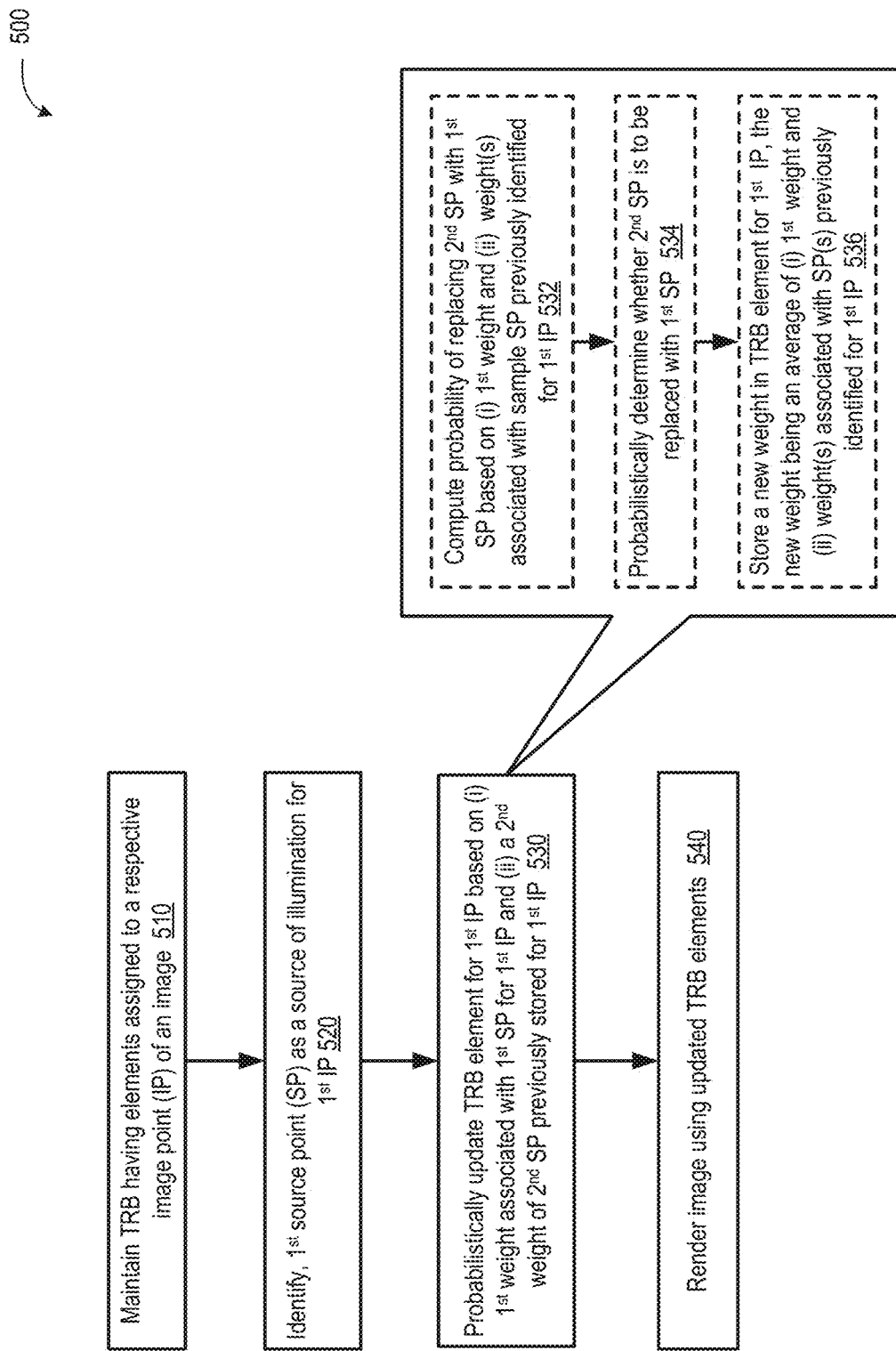
FIG. 5 is a flow diagram of an example method of image rendering that uses ray tracing and temporal reservoir buffer resampling, in accordance with at least some embodiments.
Figure 6:
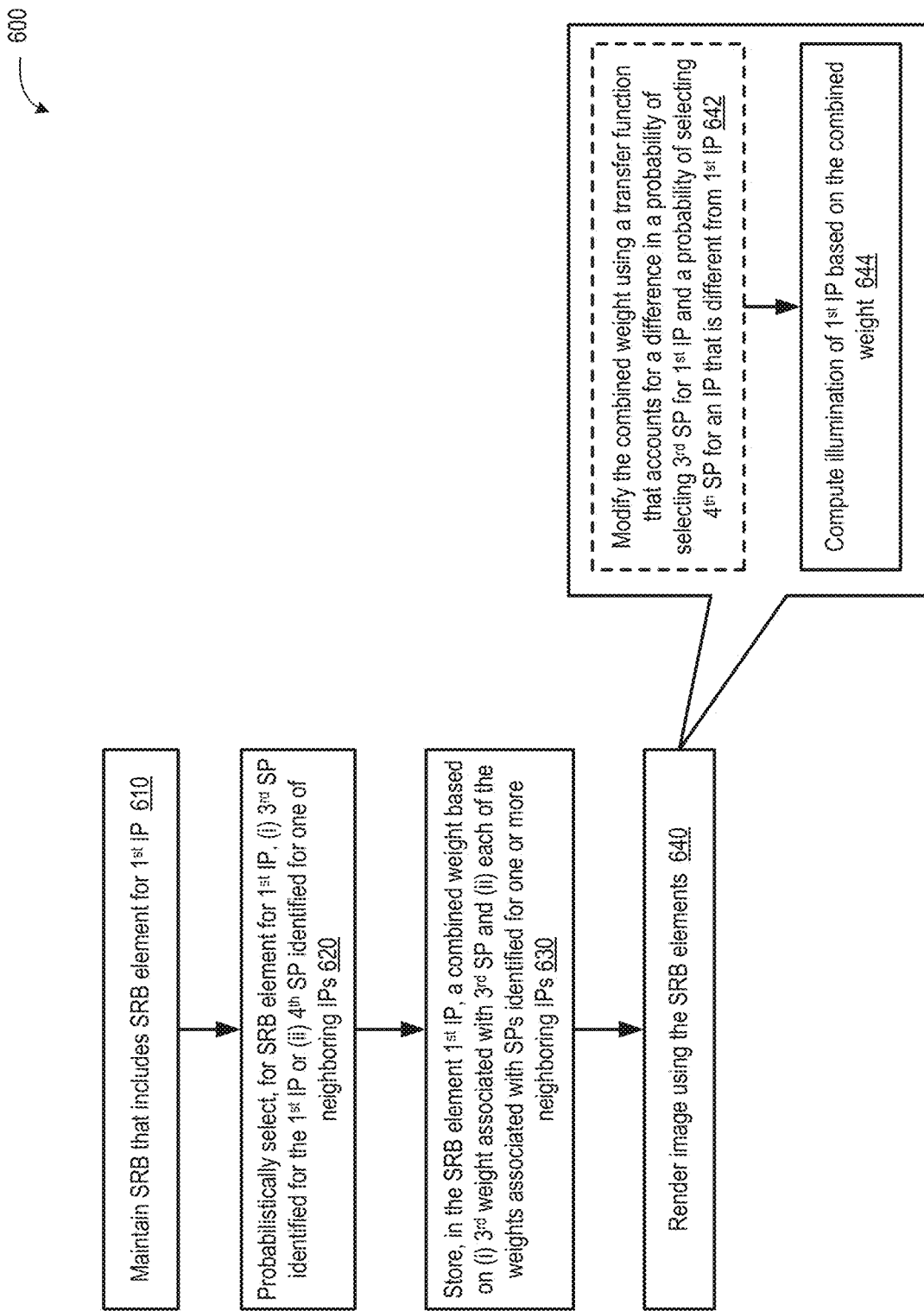
FIG. 6 is a flow diagram of an example method of image rendering that uses ray tracing and spatial reservoir buffer resampling, in accordance with at least some embodiments.

FIG. 5 and FIG. 6 are flow diagrams of example methods 500 and 600 of image rendering using efficient ray tracing with reservoir resampling, in accordance with at least some embodiments. In some embodiments, methods 500 and 600 may be performed by processing units of image processing server 110 of FIG. 1 executing instructions of one or more software modules (e.g., image rendering engine 130). Methods 500 and 600 may be performed by one or more processing units (e.g., CPUs and/or GPUs) that may include (or communicate with) one or more memory devices. In some embodiments, methods 500 and 600 may be performed by multiple processing threads (e.g., CPU threads and/or GPU threads), each thread executing one or more individual functions, routines, subroutines, or operations of the method. In some embodiments, processing threads implementing methods 500 and 600 may be synchronized (e.g., using semaphores, critical sections, and/or other thread synchronization mechanisms). Alternatively, processing threads implementing methods 500 and 600 may be executed asynchronously with respect to each other. Various operations of methods 500 and 600 may be performed in a different order compared with the order shown in FIG. 5 and FIG. 6. Some operations of methods 500 and 600 may be performed concurrently with other operations. In some embodiments, one or more operations shown in FIG. 5 and FIG. 6 may be optional.

FIG. 5 is a flow diagram of an example method 500 of image rendering that uses ray tracing and temporal reservoir buffer resampling, in accordance with at least some embodiments. Method 500 may be performed to render an image of a scene (static or dynamic). Processing units performing method 500 may maintain, at block 510, a temporal reservoir buffer (TRB) that includes a plurality of TRB elements. Each of the plurality of TRB elements may be assigned to a respective image point (IP) of a plurality of IPs of the image. For example, TRB elements may be assigned to various pixels of the image being rendered and each of the pixels may be associated with a specific IP that illuminates the respective pixel. At block 520, method 500 may continue with the processing units identifying, for a first IP (e.g., IP 215 in FIG. 2) of the plurality of IPs, a first sample point (e.g., SP 240-1) of the scene as a source of illumination for the first IP. In some embodiments, identifying the first sample point of the scene as a possible source of illumination for the first IP may include establishing that a ray (e.g., ray 230-1) extended form the first IP to the first sample point is unobstructed. In some embodiments, identifying the first sample point $x_M$ of the scene as a possible source of illumination for the first IP includes probabilistically selecting the first sample point according to a chosen distribution function (e.g., $p_0(x)$). For example, the chosen distribution function may be an isotropic distribution, a cosine distribution, or some other distribution, which may be chosen based on the case of sampling, or other criteria.

At block 530, method 500 may continue with the processing units probabilistically updating a TRB element for the first IP based on (i) a first weight (e.g., $w(x_M)$) associated with the first sample point for the first IP and (ii) a second weight (e.g., $W_{M-1}$) previously stored in the TRB element for the first IP. The second weight may be associated with a second sample point (e.g., one of SP 240-2, SP 240-4, or any other SP not shown in FIG. 2) previously identified for the first IP. In some embodiments, the image being rendered is a dynamic image, and the first sample point may be identified in association with a first frame of the dynamic image. Likewise, the second sample point may have been identified in association with a previous (second) frame of the dynamic image. The first weight, e.g., $w(x_M)$, may be determined based on a value of the chosen distribution function associated with the first sample point, $p_0(x_M)$. For example, the first weight may be a ratio of the target distribution function $p(x_M)$ and the chosen distribution function $p_0(x_M)$: $w(x_M)=p(x_M)/p_0(x_M)$.

In some embodiments, as depicted by a blowout section of method 500, probabilistically updating the TRB element for the first IP may include, at example block 532, computing a probability of replacing the second sample point (e.g., previously discovered SP) as the source of illumination for the first IP with the first sample point. The probability of replacing may be based on (i) the first weight (e.g., $w(x_M)$), and (ii) one or more weights (e.g., $w(x_1)$, $w(x_2)$, etc.), associated with sample points (e.g., $x_1$, $x_2$, etc.), previously identified for the first IP. For example, the one or more weights ($w(x_1)$, $w(x_2)$, etc.) may determine the second weight $W_{M-1}$ (as described above in conjunction with FIG. 3A), which may, in turn, determine the probability of replacing.

At example block 534, the processing units may probabilistically determine, based on the computed probability, whether the second sample point is to be replaced with the first sample point. At example block 536, the processing units may store a new (e.g., updated) weight in the TRB element for the first IP. As described above in conjunction with FIG. 3A, the new weight (e.g., $W_M$) may be an average of (i) the first weight (e.g., $w(x_M)$) and (ii) each of the one or more weights ($w(x_1)$, $w(x_2)$, etc.) associated with the sample points previously identified for the first IP.

At block 540, method 500 may continue with the processing units rendering the image of the scene using a plurality of updated TRB elements, which may include the updated TRB element for the first IP as well as multiple updated TRB elements for other IPs of the image. Rendering the image of the scene may further include using a radiance of the first sample point (or any other sample point currently stored in the TRB element for the first IP). The radiance may be determined in view of the distance from the first sample point (or the sample point currently stored in the TRB element for the first IP) to the IP, the distance from the IP to the pixel receiving light from the IP, orientations and types of the surfaces at the IP and the first sample point(s), and other physical and geometrical properties.

FIG. 6 is a flow diagram of an example method 600 of image rendering that uses ray tracing and spatial reservoir buffer resampling, in accordance with at least some embodiments. In some embodiments, method 600 may be preceded with performance of some of the blocks of method 500, e.g., blocks 510-530 (and in some embodiments, blocks 532-536). Processing units performing method 600 may maintain, at block 610, a spatial reservoir buffer (SRB) that includes a plurality of SRB elements. The SRB may be used for more accurate and efficient rendering of the image. Each of the plurality of SRB elements may be assigned (similarly to TRB elements) to a respective IP of the image. For example, a first SRB element may be assigned to the first IP and the second (third, etc.) element may be assigned to the second (third, etc.) IP.

At block 620, the processing units performing method 600 may probabilistically select a sample point for inclusion into the SRB element for the first IP. The sample point may be selected from a number of candidate points. For example, among the candidate points may be a sample point $y_A$ (herein referred to as a third sample point) identified as a source of illumination for the first IP. In some embodiments, the third sample point may be a sample point that is taken from the TRB element for the first IP (e.g., as depicted in FIG. 3B). It should be understood that the third sample point may be the first sample point of method 600, the second sample point of method 600, or any other point discovered as a source of illumination of the first IP. Also among candidate points may be one or more sample points identified as sources of illumination for corresponding one or more neighboring IPs, e.g., a fourth sample point $y_B$ (identified for a second IP), a fifth sample point $y_C$ (identified for a third IP), and so on. In some embodiments, each or at least some of the sample points $y_B$, $y_C$, etc., may also be stored in the elements of TRB associated with the respective pixels/IPs of the image being rendered.

At block 630, the processing units performing method 600 may store, in the SRB element for the first IP, a combined weight (e.g., $W_{M_A+M_B+M_C+\ldots}$, as described in more detail above in conjunction with FIG. 3B) that is based on a number of weights. For example, the combined weight may be based on a third weight (e.g., $W_{M_A}$) associated with the third sample point and may further be based on each of the weights (e.g., $M_B$, $M_C$, etc.) associated with the one or more sample points identified for the corresponding one or more neighboring IPs. At block 640, method 600 may continue with the processing units rendering the image of the scene using the plurality of SRB elements, which may include the SRB element for the first IP (and may similarly include other SRB elements for various other IPs) of the image.

In some embodiments, as depicted by the blowout section of FIG. 6, rendering the image of the scene may include some other operations. For example, as depicted by block 642, the processing units may determine that the fourth sample point (e.g., a non-native sample point) is selected for the SRB element for the first IP. Responsive to making such a determination, the processing units may modify the combined weight using a transfer function that accounts for a difference in a probability of selecting the third sample point for the first IP and a probability of selecting the fourth sample point for an IP that is different from the first IP. As described in conjunction with FIG. 4A and FIG. 4B, the transfer function may include a Jacobian of a transformation from an element of solid angles $d\Omega_A$ (related to directions of rays extended from the first IP) to an element of solid angles $d\Omega_B$ (related to directions of rays extended from the second IP). At block 644, the processing units performing method 600 may further use, during rendering of the image of the scene and computing of the illumination of the first IP, the combined weight stored in the SRB element for the first IP. For example, the combined weight may be adjusted by the transfer function $J$, e.g., by multiplication, $W_{M_A+M_B+M_C+\ldots} \rightarrow J \cdot W_{M_A+M_B+M_C+\ldots}$. It should be understood that in some embodiments the transfer function may be used that is different from the Jacobian.

Inference and Training Logic

Figure 7A:
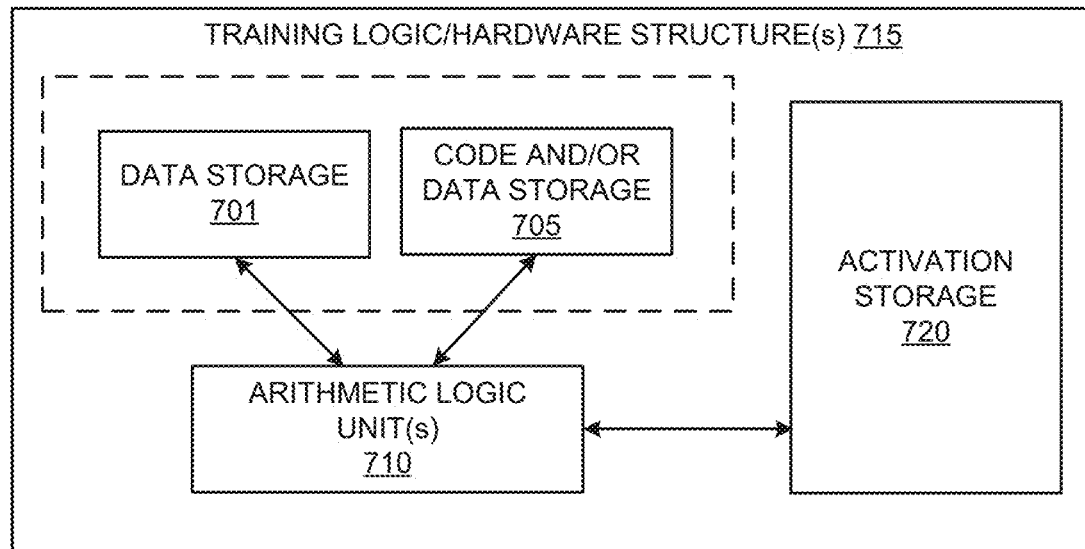
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
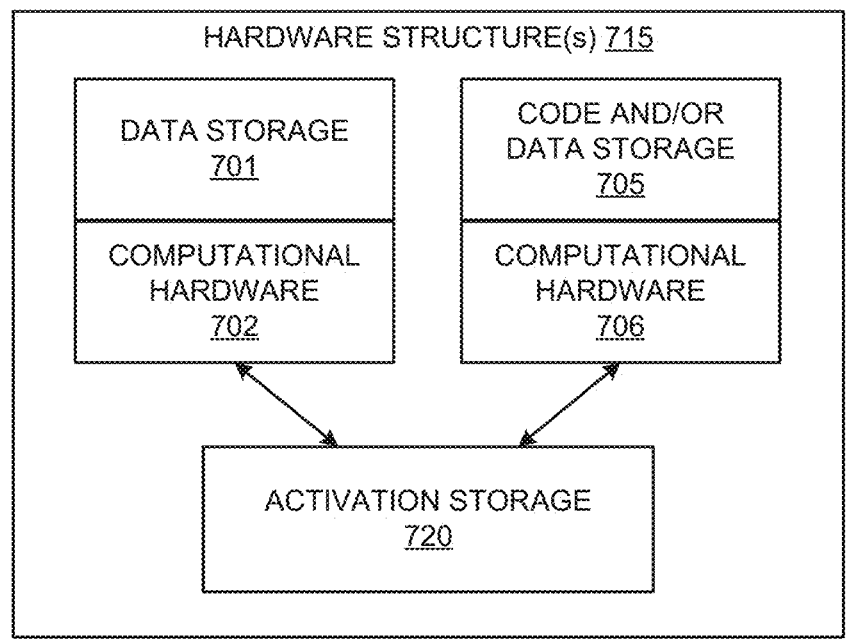
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 105 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
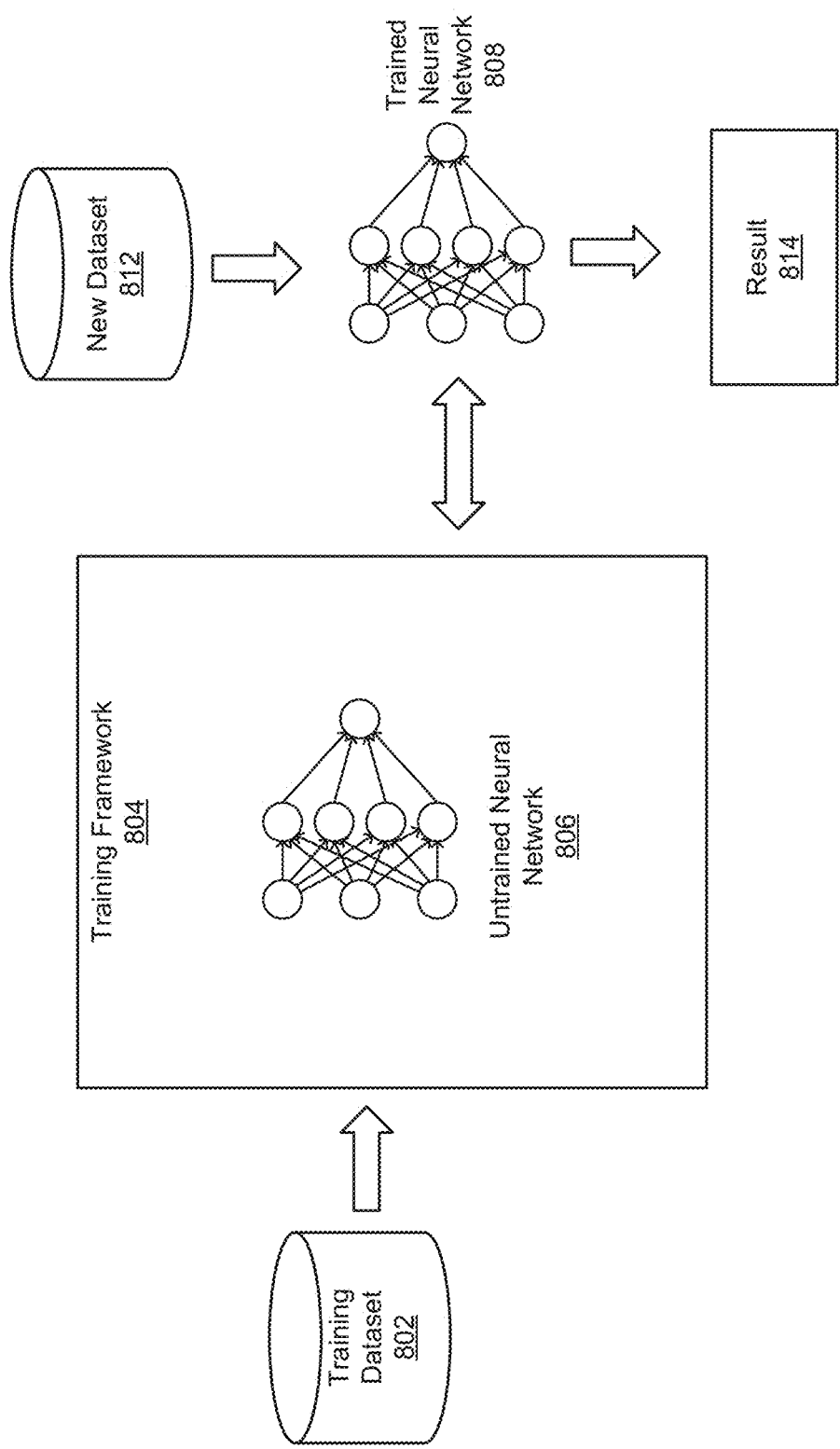
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 may then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 may learn groupings within training dataset 802 and may determine how individual inputs are related to untrained dataset 802. In at least one embodiment, unsupervised training may be used to generate a self-organizing map in trained neural network 808 capable of performing operations useful in reducing dimensionality of new dataset 812. In at least one embodiment, unsupervised training may also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
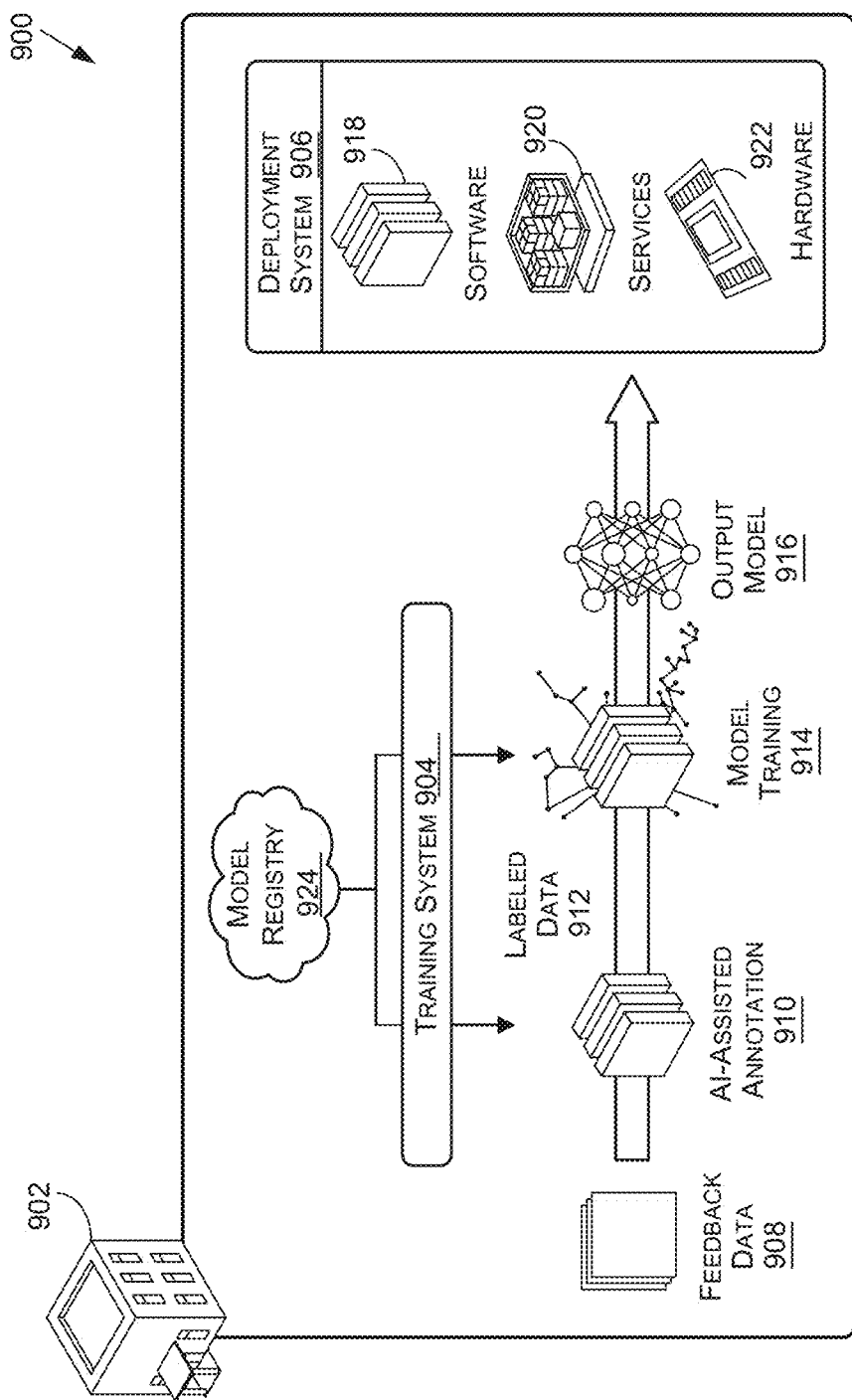
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some of applications used in advanced processing and inferencing pipelines may use machine learning models or other AI to perform one or more processing steps. In at least one embodiment, machine learning models may be trained at facility 902 using feedback data 908 (such as feedback data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
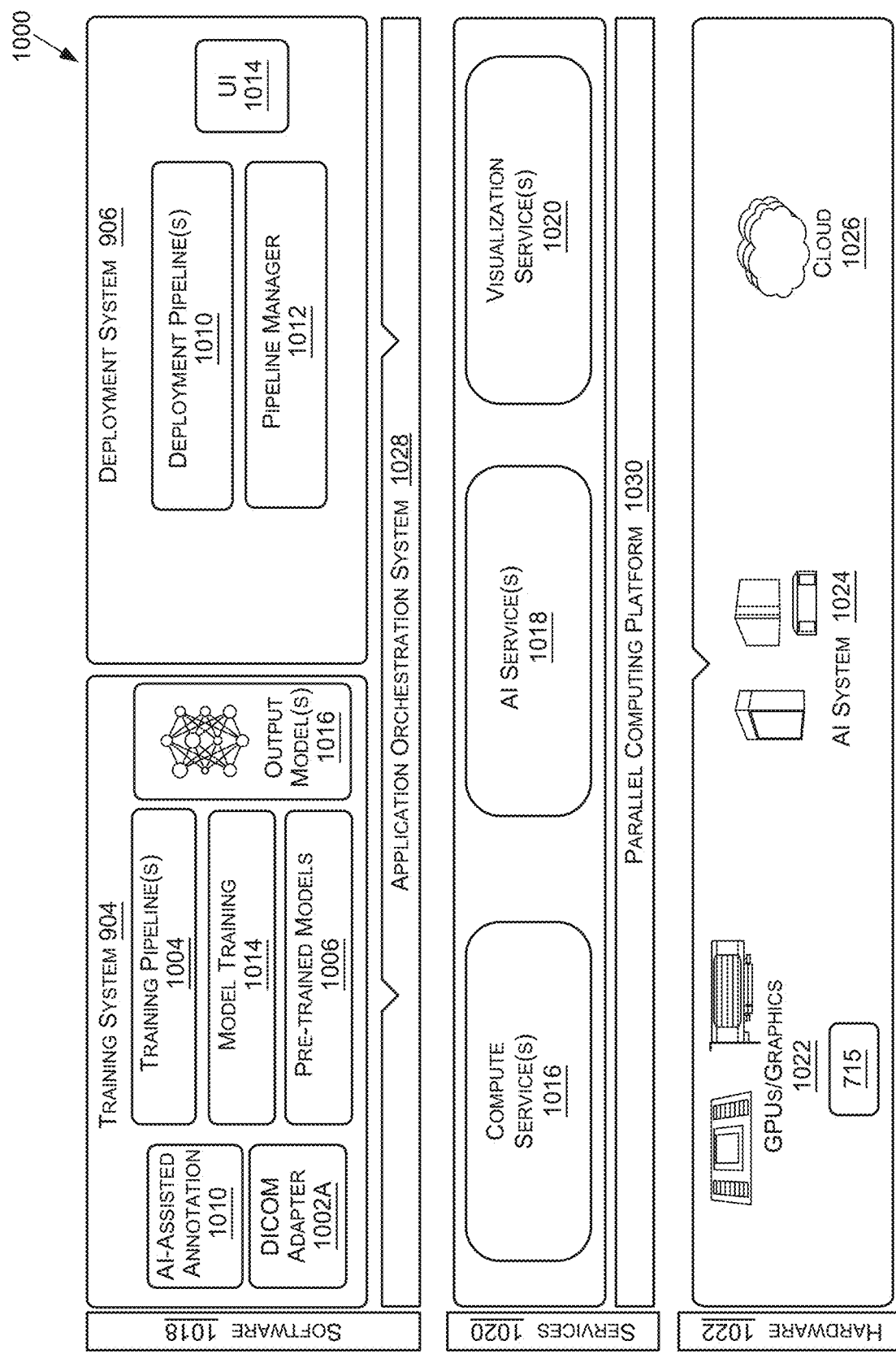
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity—who provides an inference or image processing request—may browse a container registry and/or model registry 924 for an application, container, dataset, machine learning model, etc., select a desired combination of elements for inclusion in data processing pipeline, and submit an processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel (e.g., using a parallel computing platform 1030 (FIG. 10)). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon a same inference service to perform one or more inferencing tasks.

In at least one embodiment, hardware 922 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, as non-limiting examples. In at least one embodiment, at least some of computing environment of deployment system 906 and/or training system 904 may be executed in a datacenter one or more supercomputers or high performance computing systems, with GPU optimized software (e.g., hardware and software combination of NVIDIA's DGX system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 3006) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public IPs that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines data 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004 similar to a first example described with respect to FIG. 9 may be used for a first machine learning model, training pipeline 1004 similar to a second example described with respect to FIG. 9 may be used for a second machine learning model, and training pipeline 1004 similar to a third example described with respect to FIG. 9 may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment or embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines data 1010; either in addition to, or in lieu of AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s) (e.g., facility 902). In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines data 1010. In at least one embodiment, deployment pipelines data 1010 may include any number of applications that may be sequentially, non-sequentially, or otherwise applied to feedback data (and/or other data types)—including AI-assisted annotation, as described above. In at least one embodiment, as described herein, a deployment pipeline data 1010 for an individual device may be referred to as a virtual instrument for a device. In at least one embodiment, for a single device, there may be more than one deployment pipeline data 1010 depending on information desired from data generated by a device.

In at least one embodiment, applications available for deployment pipelines data 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface data 1014 (e.g., a graphical user interface, a web interface, etc.) that may be used to select applications for inclusion in deployment pipeline(s) data 1010, arrange applications, modify or change applications or parameters or constructs thereof, use and interact with deployment pipeline(s) data 1010 during set-up and/or deployment, and/or to otherwise interact with deployment system 906. In at least one embodiment, although not illustrated with respect to training system 904, user interface data 1014 (or a different user interface) may be used for selecting models for use in deployment system 906, for selecting models for training, or retraining, in training system 904, and/or for otherwise interacting with training system 904.

In at least one embodiment, pipeline manager data 1012 may be used, in addition to an application orchestration system 1028, to manage interaction between applications or containers of deployment pipeline(s) data 1010 and services 920 and/or hardware 922. In at least one embodiment, pipeline manager data 1012 may be configured to facilitate interactions from application to application, from application to service 920, and/or from application or service to hardware 922. In at least one embodiment, although illustrated as included in software 918, this is not intended to be limiting, and in some examples pipeline manager data 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) data 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager data 1012 and application orchestration system 1028. In at least one embodiment, so long as an expected input and/or output of each container or application is known by a system (e.g., based on constructs of applications or containers), application orchestration system 1028 and/or pipeline manager data 1012 may facilitate communication among and between, and sharing of resources among and between, each of applications or containers. In at least one embodiment, because one or more of applications or containers in deployment pipeline(s) data 1010 may share same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1028) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 920 leveraged by and shared by applications or containers in deployment system 906 may include compute services data 1016, AI services data 1018, visualization services 1020, and/or other service types. In at least one embodiment, applications may call (e.g., execute) one or more of services 920 to perform processing operations for an application. In at least one embodiment, compute services data 1016 may be leveraged by applications to perform super-computing or other high-performance computing (HPC) tasks. In at least one embodiment, compute service(s) data 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services data 1018 may be leveraged to perform inferencing services for executing machine learning model(s) associated with applications (e.g., tasked with performing one or more processing tasks of an application). In at least one embodiment, AI services data 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) data 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services data 1018.

In at least one embodiment, shared storage may be mounted to AI services data 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, a scheduler (e.g., of pipeline manager data 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) data 1010. In at least one embodiment, GPUs 1022 may be leveraged by visualization services 1020 to generate visualizations. In at least one embodiment, rendering effects, such as ray-tracing, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA and/or QUADRO GPUs) may include any number of GPUs that may be used for executing processing tasks of compute services data 1016, AI services data 1018, visualization services 1020, other services, and/or any of features or functionality of software 918. For example, with respect to AI services data 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may tasked with executing at least some of services 920 of system 1000, including compute services data 1016, AI services data 1018, and/or visualization services 1020, as described herein. In at least one embodiment, cloud 1026 may perform small and large batch inference (e.g., executing NVIDIA's TENSOR RT), provide an accelerated parallel computing API and platform 1030 (e.g., NVIDIA's CUDA), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry—such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

At least one embodiment of the disclosure may be described in view of the following clauses:

In clause 1, a method of rendering an image of a scene, the method comprising: maintaining a temporal reservoir buffer (TRB) comprising a plurality of TRB elements, wherein each of the plurality of TRB elements is assigned to a respective image point (IP) of a plurality of IPs of the image; identifying, for a first IP of the plurality of IPs, a first sample point of the scene as a source of illumination for the first IP; probabilistically updating a TRB element for the first IP based on (i) a first weight associated with the first sample point for the first IP and (ii) a second weight previously stored in the TRB element for the first IP, the second weight associated with a second sample point for the first IP; and rendering the image of the scene using a plurality of updated TRB elements that comprises the updated TRB element for the first IP.

In clause 2, the method of clause 1, wherein rendering the image of the scene comprises using a radiance of the first sample point.

In clause 3, the method of clause 1, wherein identifying the first sample point of the scene as a source of illumination for the first IP comprises establishing that a ray extended from the first IP to the first sample point is unobstructed.

In clause 4, the method of clause 1, wherein identifying the first sample point of the scene as a source of illumination for the first IP comprises probabilistically selecting the first sample point according to a chosen distribution function.

In clause 5, the method of clause 4, wherein the first weight is determined based on a value of the chosen distribution function associated with the first sample point.

In clause 6, the method of clause 1, wherein probabilistically updating the TRB element for the first IP comprises: computing a probability of replacing the second sample point as the source of illumination for the first IP with the first sample point, wherein the probability of replacing is based on (i) the first weight and (ii) one or more weights associated with sample points previously identified for the first IP that comprise the second sample point; and probabilistically determining, based on the computed probability, whether the second sample point is to be replaced with the first sample point.

In clause 7, the method of clause 6, further comprising: storing a new weight in the TRB element for the first IP, wherein the new weight is an average of (i) the first weight and (ii) each of the one or more weights associated with sample points previously identified for the first IP.

In clause 8, the method of clause 1, wherein the image is a dynamic image, and wherein the first sample point is identified in association with a first frame of the dynamic image and the second sample point was identified in association with a previous second frame of the dynamic image.

In clause 9, the method of clause 1, further comprising: maintaining a spatial reservoir buffer (SRB) comprising a plurality of SRB elements that include a SRB element for the first IP; probabilistically selecting, for the SRB element for the first IP, (i) a third sample point identified as a source of illumination for the first IP or (ii) a fourth sample point of one or more sample points identified as sources of illumination for corresponding one or more neighboring IPs; and rendering the image of the scene using the plurality of SRB elements comprising the SRB element for the first IP.

In clause 10, the method of clause 9, wherein the third sample point is a sample point stored in the TRB element for the first IP.

In clause 11, the method of clause 9, further comprising: storing, in the SRB element for the first IP, a combined weight that is based on (i) a third weight associated with the third sample point and (ii) each of the weights associated with the one or more sample points identified for the corresponding one or more neighboring IPs.

In clause 12, the method of clause 11, wherein rendering the image of the scene using the plurality of the SRB elements comprises: computing the illumination of the first IP based on the combined weight stored in the SRB element for the first IP.

In clause 13, the method of clause 11, wherein rendering the image of the scene using the plurality of the SRB elements comprises: responsive to selecting the fourth sample point for the SRB element for the first IP, modifying the combined weight using a transfer function that accounts for a difference in a probability of selecting the third sample point for the first IP and a probability of selecting the fourth sample point for an IP that is different from the first IP.

In clause 14, a system comprising: a memory device; and one or more processing devices, communicatively coupled to the memory device, to: maintain a temporal reservoir buffer (TRB) comprising a plurality of TRB elements, wherein each of the plurality of TRB elements is assigned to a respective image point (IP) of a plurality of IPs of an image of a scene; identify, for a first IP of the plurality of IPs, a first sample point of the scene as a source of illumination for the first IP; probabilistically update a TRB element for the first IP based on (i) a first weight associated with the first sample point for the first IP and (ii) a second weight previously stored in the TRB element for the first IP, the second weight associated with a second sample point for the first IP; and render the image of the scene using a plurality of updated TRB elements that comprises the updated TRB element for the first IP.

In clause 15, the system of clause 14, wherein to probabilistically update the TRB element for the first IP, the one or more processing devices are to: compute a probability of replacing the second sample point as the source of illumination for the first IP with the first sample point, wherein the probability of replacing is based on (i) the first weight and (ii) one or more weights associated with sample points previously identified for the first IP that comprise the second sample point; and probabilistically determine, based on the computed probability, whether the second sample point is to be replaced with the first sample point.

In clause 16, the system of clause 15, wherein the one or more processing devices are further to: store a new weight in the TRB element for the first IP, wherein the new weight is an average of (i) the first weight and (ii) each of the one or more weights associated with sample points previously identified for the first IP.

In clause 17, the system of clause 14, wherein the one or more processing devices are further to: maintain a spatial reservoir buffer (SRB) comprising a plurality of SRB elements that include a SRB element for the first IP; probabilistically select, for the SRB element for the first IP, (i) a third sample point identified as a source of illumination for the first IP or (ii) a fourth sample point of one or more sample points identified as sources of illumination for corresponding one or more neighboring IPs; and render the image of the scene using the plurality of SRB elements comprising the SRB element for the first IP.

In clause 18, the system of clause 17, wherein the one or more processing devices are further to: store, in the SRB element for the first IP, a combined weight that is based on (i) a third weight associated with the third sample point and (ii) each of the weights associated with the one or more sample points identified for the corresponding one or more neighboring IPs; and compute the illumination of the first IP based on the combined weight stored in the SRB element for the first IP.

In clause 19, the system of clause 18, wherein to render the image of the scene using the plurality of the SRB elements, the one or more processing devices are further to: responsive to selecting the fourth sample point for the SRB element for the first IP, modify the combined weight using a transfer function that accounts for a difference in a probability of selecting the third sample point for the first IP and a probability of selecting the fourth sample point for an IP that is different from the first IP.

In clause 20, a non-transitory computer-readable medium storing instructions thereon, wherein the instructions, when executed by a processing device, cause the processing device to: maintain a temporal reservoir buffer (TRB) comprising a plurality of TRB elements, wherein each of the plurality of TRB elements is assigned to a respective image point (IP) of a plurality of IPs of an image of a scene; identify, for a first IP of the plurality of IPs, a first sample point of the scene as a source of illumination for the first IP; probabilistically update a TRB element for the first IP based on (i) a first weight associated with the first sample point for the first IP and (ii) a second weight previously stored in the TRB element for the first IP, the second weight associated with a second sample point for the first IP; and render the image of the scene using a plurality of updated TRB elements that comprises the updated TRB element for the first IP.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   identifying, for a pixel of a current image of a scene, a point in the scene as contributing to illumination of the pixel in the current image of the scene;
   updating, based at least on the point, a buffer of stored radiance information for the pixel, wherein the buffer of stored radiance information is based on one or more previously identified points in the scene as contributing to illumination of the pixel or one or more additional pixels in at least one previous image of the scene, wherein the pixel and the one or more additional pixels depict a same object in the scene; and
   rendering, using the updated buffer of stored radiance information, the current image of the scene.

2. The method of claim 1, wherein identifying the point in the scene as contributing to illumination of the pixel comprises establishing that a ray extending from the point to the pixel is unobstructed.

3. The method of claim 1, wherein updating the buffer of stored radiance information for the pixel is further based at least on:
   a first weight associated with the point, and
   a second weight associated with the one or more previously identified points.

4. The method of claim 3, wherein identifying the point in the scene as contributing to illumination of the pixel comprises:
probabilistically sampling the point according to a predetermined distribution function, and wherein the first weight is determined based at least on a value of the predetermined distribution function computed for the sampled point.

5. The method of claim 3, wherein the buffer of stored radiance information comprises coordinates of the one or more previously identified points, and wherein updating the buffer comprises:
computing a probability of replacing the coordinates of the one or more previously identified points with coordinates of the point, wherein the probability of replacing is computed based on the first weight and the second weight; and
probabilistically determining, based on the computed probability, whether the coordinates of the one or more previously identified points are to be replaced with the coordinates of the point.

6. The method of claim 5, wherein updating the buffer of stored radiance information further comprises:
storing, in the buffer, a new weight comprising a linear combination of the first weight and the second weight.

7. The method of claim 1, wherein the current image and the at least one previous image are part of a dynamic set of images, and wherein the pixel and the one or more additional pixels depict the same object at different times.

8. The method of claim 1, wherein updating the buffer of stored radiance information for the pixel is further based on one or more points identified as contributing to illumination of one or more neighborhood pixels located within a predetermined neighborhood of the pixel.

9. A system comprising:
a memory device; and
one or more processing units, communicatively coupled to the memory device, to:
identify, for a pixel of a current image of a scene, a point in the scene as contributing to illumination of the pixel in the current image of the scene;
update, based at least on the point, a buffer of stored radiance information for the pixel, wherein the buffer of stored radiance information is based on one or more previously identified points in the scene as contributing to illumination of the pixel or one or more additional pixels in at least one previous image of the scene, wherein the pixel and the one or more additional pixels depict a same object in the scene; and
render, using the updated buffer of stored radiance information, the current image of the scene.

10. The system of claim 9, wherein to identify the point in the scene as contributing to illumination of the pixel, the one or more processing units are to:
establish that a ray extending from the point to the pixel is unobstructed.

11. The system of claim 9, wherein the buffer of stored radiance information for the pixel is further updated based at least on:
a first weight associated with the point, and
a second weight associated with the one or more previously identified points.

12. The system of claim 11, wherein to identify the point in the scene as contributing to illumination of the pixel, the one or more processing units are to:
probabilistically sample the point according to a predetermined distribution function, and wherein the first weight is determined based at least on a value of the predetermined distribution function computed for the sampled point.

13. The system of claim 11, wherein the buffer of stored radiance information comprises coordinates of the one or more previously identified points, and wherein to update the buffer, the one or more processing units are to:
compute a probability of replacing the coordinates of the one or more previously identified points with coordinates of the point, wherein the probability of replacing is computed based on the first weight and the second weight; and
probabilistically determine, based on the computed probability, whether the coordinates of the one or more previously identified points are to be replaced with the coordinates of the point.

14. The system of claim 13, wherein to update the buffer of stored radiance information further, the one or more processing units are further to:
store, in the buffer, a new weight comprising a linear combination of the first weight and the second weight.

15. The system of claim 9, wherein the current image and the at least one previous image are part of a dynamic set of images, and wherein the pixel and the one or more additional pixels depict the same object at different times.

16. The system of claim 9, wherein the buffer of stored radiance information for the pixel is further updated based on one or more points identified as contributing to illumination of one or more neighborhood pixels located within a predetermined neighborhood of the pixel.

17. A processor comprising one or more processing devices, to:
identify, for a pixel of a current image of a scene, a point in the scene as contributing to illumination of the pixel in the current image of the scene;
update, based at least on the point, a buffer of stored radiance information for the pixel, wherein the buffer of stored radiance information is based on one or more previously identified points in the scene as contributing to illumination of the pixel or one or more additional pixels in at least one previous image of the scene, wherein the pixel and the one or more additional pixels depict a same object in the scene; and
render, using the updated buffer of stored radiance information, the current image of the scene.

18. The processor of claim 17, wherein the buffer of stored radiance information for the pixel is further updated based at least on:
a first weight associated with the point, and
a second weight associated with the one or more previously identified points; and wherein to identify the point in the scene as contributing to illumination of the pixel, the processor is to:
probabilistically sample the point according to a predetermined distribution function, and wherein the first weight is determined based at least on a value of the predetermined distribution function computed for the sampled point.

19. The processor of claim 18, wherein the buffer of stored radiance information comprises coordinates of the one or more previously identified points, and wherein to update the buffer, the processor is to:
compute a probability of replacing the coordinates of the one or more previously identified points with coordinates of the point, wherein the probability of replacing is computed based on the first weight and the second weight; and store, in the buffer, a new weight comprising a linear combination of the first weight and the second weight.

20. The processor of claim 17, wherein the buffer of stored radiance information for the pixel is further updated based on one or more points identified as contributing to illumination of one or more neighborhood pixels located within a predetermined neighborhood of the pixel.

* * * * *